(12) United States Patent
Ye et al.

(10) Patent No.: US 11,048,305 B1
(45) Date of Patent: Jun. 29, 2021

(54) BENDABLE MOBILE TERMINAL

(71) Applicant: WUHAN CHINA STAR OPTOELECTRONICS SEMICONDUCTOR DISPLAY TECHNOLOGY CO., LTD., Wuhan (CN)

(72) Inventors: Shanghong Ye, Wuhan (CN); Wei Bi, Wuhan (CN); Juanjuan Wang, Wuhan (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 94 days.

(21) Appl. No.: 16/093,979

(22) PCT Filed: Aug. 27, 2018

(86) PCT No.: PCT/CN2018/102417
§ 371 (c)(1),
(2) Date: Dec. 5, 2019

(87) PCT Pub. No.: WO2019/227722
PCT Pub. Date: Dec. 5, 2019

(30) Foreign Application Priority Data

May 28, 2018 (CN) .......................... 201810520174.9

(51) Int. Cl.
*H04M 1/02* (2006.01)
*G06F 1/16* (2006.01)

(52) U.S. Cl.
CPC .......... *G06F 1/1681* (2013.01); *G06F 1/1616* (2013.01); *G06F 1/1652* (2013.01); *H04M 1/022* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,477,269 B2* | 10/2016 | Morrison | .............. | G06F 1/1616 |
| 9,786,207 B2* | 10/2017 | Kim | .............. | G06F 1/1652 |
| 10,185,367 B2* | 1/2019 | Kim | .............. | G06F 1/1675 |
| 10,231,347 B2* | 3/2019 | Seo | .............. | H04M 1/022 |

(Continued)

FOREIGN PATENT DOCUMENTS

| | | |
|---|---|---|
| CN | 103914273 A | 7/2014 |
| CN | 106462197 A | 2/2017 |

(Continued)

*Primary Examiner* — Lisa Lea-Edmonds
(74) *Attorney, Agent, or Firm* — Soroker Agmon Nordman (57) ABSTRACT

A bendable mobile terminal is provided. The bendable mobile terminal includes a hinge module, which includes a plurality of rotating rods. A cross-section of one of the rotating rod includes a top surface, a bottom surface, two vertical surfaces each connected with two sides of the top surface, and two inclined surfaces each connected between the vertical surface and the bottom surface. When the mobile terminal is in a folded state, the two case modules are folded, wherein the rotating rods are arranged in an arc shape and the adjacent inclined surfaces are attached to each other, so as to avoid damage of the flexible display body when in the folded state.

19 Claims, 4 Drawing Sheets

(56) References Cited

U.S. PATENT DOCUMENTS

| | | | | |
|---|---|---|---|---|
| 10,306,788 | B2* | 5/2019 | Bi | E05D 3/06 |
| 10,356,922 | B2* | 7/2019 | Chen | H05K 5/0017 |
| 10,447,829 | B2* | 10/2019 | Lin | G06F 1/1681 |
| 10,575,415 | B2* | 2/2020 | Shin | H01L 51/0097 |
| 2015/0380287 | A1 | 12/2015 | Ocker et al. | |
| 2016/0187935 | A1* | 6/2016 | Tazbaz | H04M 1/0216 |
| | | | | 361/679.03 |
| 2017/0208157 | A1* | 7/2017 | Kim | G06F 1/1652 |
| 2018/0101200 | A1 | 4/2018 | Myeong et al. | |
| 2018/0329460 | A1* | 11/2018 | Song | G06F 1/1681 |
| 2019/0032380 | A1* | 1/2019 | Wu | E05D 3/02 |
| 2019/0041913 | A1* | 2/2019 | Yeh | G06F 1/1652 |
| 2019/0041914 | A1* | 2/2019 | Yeh | G06F 1/1616 |
| 2019/0212786 | A1* | 7/2019 | Lin | G06F 1/1681 |
| 2019/0380218 | A1* | 12/2019 | Moon | H05K 5/0086 |
| 2020/0359515 | A1* | 11/2020 | Choi | G06F 1/1652 |
| 2020/0396852 | A1* | 12/2020 | Yoo | H05K 5/0226 |

FOREIGN PATENT DOCUMENTS

| | | |
|---|---|---|
| CN | 206100081 U | 4/2017 |
| CN | 107277197 A | 10/2017 |
| CN | 206598050 U | 10/2017 |
| CN | 207115888 U | 3/2018 |
| CN | 107919062 A | 4/2018 |
| CN | 108076171 A | 5/2018 |

* cited by examiner

BENDABLE MOBILE TERMINAL

FIELD OF INVENTION

The present disclosure relates to a technical field of mobile terminals, and more particularly to a bendable mobile terminal.

BACKGROUND OF INVENTION

With development of information society, requirements for display devices increases, so as to push rapid development of an AMOLED display industry. Because AMOLED displays have advantages of being light and thin, unbreakable, bendable, foldable, and portable, they are usually used in flexible products, such as smart watches, VR headsets, and mobile phones.

For the mobile phones, a common flexible mobile phone includes left and right case modules, a flexible display screen disposed on the left and right case modules, and a single-shaft hinge connected between left and right support structures to be convenient for bend. During bending, the flexible display screen is fixed on the left and right case modules and is affected by a rotation radius of the single-shaft hinge, so that the flexible display screen bears a pulling force at the bending place and is broken.

Hence, it is necessary to provide a bendable mobile terminal with a multi-shaft hinge module to solve the above-mentioned technical problems.

SUMMARY OF INVENTION

The present disclosure provides a bendable mobile terminal with a multi-shaft hinge module to solve a technical problem that a bendable area of a display screen is easily broken when a conventional bendable mobile terminal is bent.

The present disclosure provides a bendable mobile terminal, which comprises:
two case modules configured to carry a flexible display body;
a hinge module disposed between the two case modules, such that the two case modules are being able to be bent; and the flexible display body fixedly disposed on the two case modules;
wherein the hinge module comprises two hinge assemblies connecting the two case modules together and a plurality of rotating rods disposed between the two hinge assemblies; one of the hinge assembly comprises a hinge body formed by a plurality of chain segments; and the rotating rods are fixedly connected with the hinge body and are correspondingly rotated with a bend of the hinge body;
a cross-section of one of the rotating rod comprises a convex-arc-shape top surface located near the flexible display body, a bottom surface located opposite the top surface, two vertical surfaces each connected with two sides of the top surface, and two inclined surfaces each connected between the vertical surface and the bottom surface;
when the mobile terminal is in a flat state, the two case modules are unfolded side by side, wherein the rotating rods are arranged side by side, and the adjacent vertical surfaces are arranged in parallel; and
when the mobile terminal is in a folded state, the two case modules are folded; wherein the rotating rods are arranged in an arc shape and the adjacent inclined surfaces are attached to each other, so as to reduce a pulling force on the flexible display body;
wherein a number of the rotating rods is an even number;
wherein two sides of the hinge module are respectively connected with the two case modules by a spring module, wherein one side of the spring module is fixedly connected with the hinge module, and another side of the spring module is slidably connected to the case module;
the spring module comprises a bottom case, a plurality of placement grooves formed on the bottom case, and a plurality of springs disposed in the placement grooves;
the case module comprises an upper case for an arrangement of the flexible display body, a lower case for an assembly with the upper case, and a plurality of pressing portions disposed on the lower case and inserted into the placement groove for pressing the spring;
when the mobile terminal is in the flat state, the case module is away from the spring module, so that there is a sliding gap between the case module and the spring module, and the spring has a first elastic potential energy;
when the mobile terminal is in the folded state, the case module is close to the spring module, so that the sliding gap between the case module and the spring module is reduced, and the pressing portion presses the spring, thus the spring has a second elastic potential energy; and
the second elastic potential energy is greater than the first elastic potential energy.

In the present disclosure, the spring module comprises sliding grooves alternately arranged with the placement grooves; the case module comprises sliding portions alternately arranged with the pressing portions; and the sliding portions are slidably disposed in the sliding grooves.

In the present disclosure, the sliding groove comprises a first sliding groove, and the first sliding groove is symmetrically disposed at two end regions of the lower case; and the sliding portion comprises a first sliding portion, and the first sliding portion is correspondingly disposed in the first sliding groove; and
the spring module comprises a cover plate disposed on the bottom case and a limiting opening disposed on the cover plate; the first sliding portion has a limiting block disposed facing the cover plate; and the limiting block is slide and limited in the limiting opening.

In the present disclosure, the sliding groove comprises a second sliding groove, and the second sliding groove has a fixing block; the sliding portion comprises a second sliding portion, and the second sliding portion has avoidance grooves facing the fixing block; the cover plate is fixedly connected with the fixing block by a screw; and
the second sliding portion is correspondingly slidably disposed in the second sliding groove; and when the mobile terminal is in the folded state, the fixing block is located in the avoiding groove.

In the present disclosure, the bottom case comprises a limiting strip, which is disposed in the second sliding groove and at an end of the fixing block away from the hinge module; the limiting strip is located in a sliding direction of the avoidance groove; the second sliding portion comprises a limiting groove disposed on a surface of the second sliding portion back facing the cover plate;
when the mobile terminal is in the flat state, the limit strip is limited in the avoiding groove; and
when the mobile terminal is in the folded state, the limit strip is limited in the limit groove.

In the present disclosure, the hinge assembly comprises two connecting parts for connecting the spring module on the two sides of the hinge body; a receiving groove is disposed on one side of the spring module for receiving the connecting part; and the connecting part is fixedly disposed in the receiving groove.

In the present disclosure, the upper case has an avoidance opening facing the hinge module to avoid the connecting part.

In the present disclosure, the hinge body comprises a plurality of connecting shafts for connecting between the two adjacent chain segments or connecting between the chain segment and a connecting part; and the rotating rods are fixedly connected with the connecting shaft one to one.

In the present disclosure, the top surface and the vertical surface are connected by a round corner; and the vertical surface and the inclined surface are connected by a round corner.

The present disclosure further provides a bendable mobile terminal, which comprises:
two case modules configured to carry a flexible display body;
a hinge module disposed between the two case modules, such that the two case modules are being able to be bent; and the flexible display body fixedly disposed on the two case modules;
wherein the hinge module comprises two hinge assemblies connecting the two case modules together and a plurality of rotating rods disposed between the two hinge assemblies; one of the hinge assembly comprises a hinge body formed by a plurality of chain segments; and the rotating rods are fixedly connected with the hinge body and are correspondingly rotated with a bend of the hinge body;
a cross-section of one of the rotating rod comprises a convex-arc-shape top surface located near the flexible display body, a bottom surface located opposite the top surface, two vertical surfaces each connected with two sides of the top surface, and two inclined surfaces each connected between the vertical surface and the bottom surface;
when the mobile terminal is in a flat state, the two case modules are unfolded side by side, wherein the rotating rods are arranged side by side, and the adjacent vertical surfaces are arranged in parallel; and
when the mobile terminal is in a folded state, the two case modules are folded; wherein the rotating rods are arranged in an arc shape and the adjacent inclined surfaces are attached to each other, so as to reduce a pulling force on the flexible display body.

In the present disclosure, a number of the rotating rods is an even number.

In the present disclosure, two sides of the hinge module are respectively connected with the two case modules by a spring module, wherein one side of the spring module is fixedly connected with the hinge module, and another side of the spring module is slidably connected to the case module;
the spring module comprises a bottom case, a plurality of placement grooves formed on the bottom case, and a plurality of springs disposed in the placement grooves;
the case module comprises an upper case for an arrangement of the flexible display body, a lower case for an assembly with the upper case, and a plurality of pressing portions disposed on the lower case and inserted into the placement groove for pressing the spring;
when the mobile terminal is in the flat state, the case module is away from the spring module, so that there is a sliding gap between the case module and the spring module, and the spring has a first elastic potential energy;
when the mobile terminal is in the folded state, the case module is close to the spring module, so that the sliding gap between the case module and the spring module is reduced, and the pressing portion presses the spring, thus the spring has a second elastic potential energy; and
the second elastic potential energy is greater than the first elastic potential energy.

In the present disclosure, the spring module comprises sliding grooves alternately arranged with the placement grooves; the case module comprises sliding portions alternately arranged with the pressing portions; and
the sliding portions are slidably disposed in the sliding grooves.

In the present disclosure, the sliding groove comprises a first sliding groove, and the first sliding groove is symmetrically disposed at two end regions of the lower case; and the sliding portion comprises a first sliding portion, and the first sliding portion is correspondingly disposed in the first sliding groove; and
the spring module comprises a cover plate disposed on the bottom case and a limiting opening disposed on the cover plate; the first sliding portion has a limiting block disposed facing the cover plate; and the limiting block is slide and limited in the limiting opening.

In the present disclosure, the sliding groove comprises a second sliding groove, and the second sliding groove has a fixing block; the sliding portion comprises a second sliding portion, and the second sliding portion has avoidance grooves facing the fixing block; the cover plate is fixedly connected with the fixing block by a screw; and
the second sliding portion is correspondingly slidably disposed in the second sliding groove; and when the mobile terminal is in the folded state, the fixing block is located in the avoiding groove.

In the present disclosure, the bottom case comprises a limiting strip, which is disposed in the second sliding groove and at an end of the fixing block away from the hinge module; the limiting strip is located in a sliding direction of the avoidance groove; the second sliding portion comprises a limiting groove disposed on a surface of the second sliding portion back facing the cover plate;
when the mobile terminal is in the flat state, the limit strip is limited in the avoiding groove; and
when the mobile terminal is in the folded state, the limit strip is limited in the limit groove.

In the present disclosure, the hinge assembly comprises two connecting parts for connecting the spring module on the two sides of the hinge body; a receiving groove is disposed on one side of the spring module for receiving the connecting part; and the connecting part is fixedly disposed in the receiving groove.

In the present disclosure, the upper case has an avoidance opening facing the hinge module to avoid the connecting part.

In the present disclosure, the hinge body comprises a plurality of connecting shafts for connecting between the two adjacent chain segments or connecting between the chain segment and a connecting part; and the rotating rods are fixedly connected with the connecting shaft one to one.

In the present disclosure, the top surface and the vertical surface are connected by a round corner; and the vertical surface and the inclined surface are connected by a round corner.

Compared with conventional mobile terminal, the bendable mobile terminal of the present disclosure has a plurality of rotating rods in a hinge module, and the plurality of rotating rods are rotated with hinge assemblies when in a folded state, and finally, it becomes an arc shape, so that the length of the flexible display body in the folded state is almost the same as the total length of the upper surfaces of the two case modules, such that a sliding distance and a pulling force on the flexible display body can be reduced, so as to prevent being broken. This solves the technical problem that a bendable area of the display screen is easily broken when the conventional bendable mobile terminal is bent.

DESCRIPTION OF DRAWINGS

In order to more clearly describe the embodiments of the present invention or the conventional technical solutions, the description is used to make a simple introduction of the drawings used in the following embodiments. The following description of the drawings are merely some embodiments of the present invention, those of ordinary skill in the art can also obtain other drawings based on these drawings without creative effort.

DETAILED DESCRIPTION OF PREFERRED EMBODIMENTS

Referring to the drawings of the present invention, the same component is labeled as the same number. The following description is based on the particular illustrated embodiment of the present invention, which should not be construed as limiting the present invention.

Figure 1:
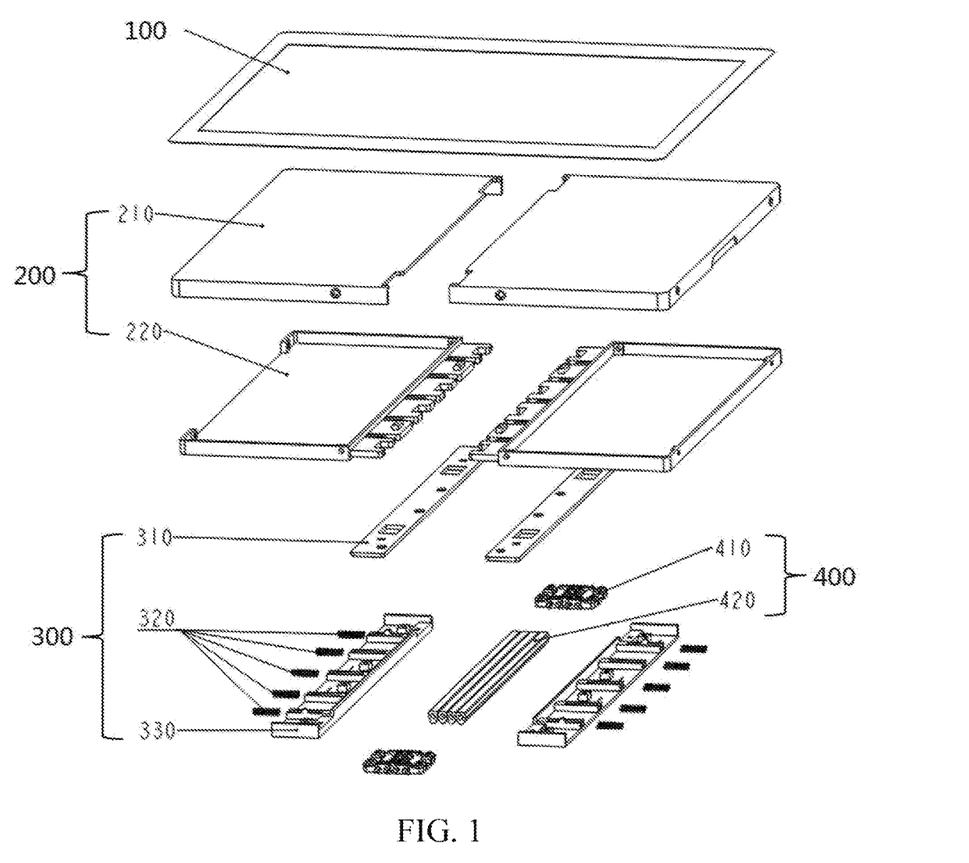
FIG. 1 is a schematic exploded structural view of a bendable mobile terminal according to an embodiment of the present disclosure.

Please refer to FIGS. 1 to 5 and FIG. 7, wherein FIG. 1 is a schematic exploded structural view of a bendable mobile terminal according to an embodiment of the present disclosure. A bendable mobile terminal of the embodiment of the present disclosure includes two case modules 200, a flexible display body 100, a hinge module 400, and two spring modules 300.

Specifically, the two case modules 200 are used to carry the flexible display body 100. The hinge module 400 is disposed between the two case modules 200, so that the two case modules 200 can be bent. The flexible display body 100 is fixedly disposed on the two case modules 200.

Figure 7:
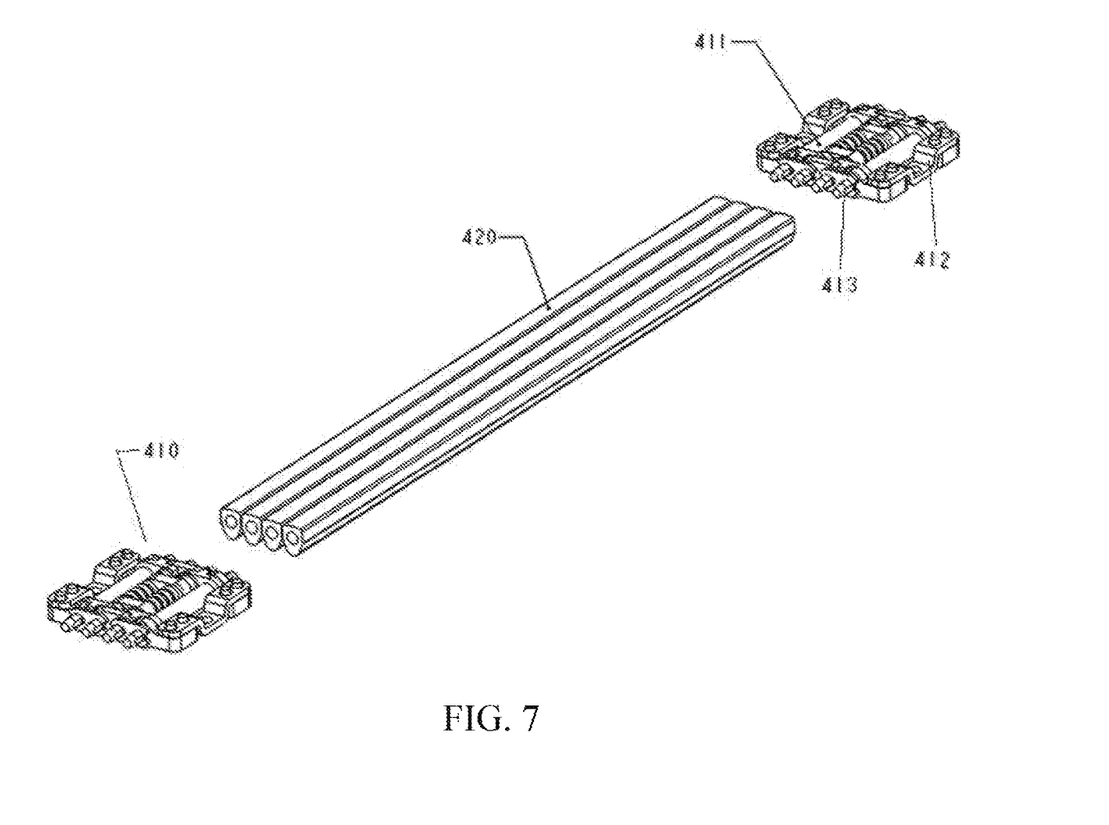
FIG. 7 is a schematic exploded structural view of the hinge module of the bendable mobile terminal according to the embodiment of the present disclosure.

Please refer to FIG. 7, the hinge module 400 includes two hinge assemblies 410 connecting the two case modules 200 together and a plurality of rotating rods 420 disposed between the two hinge assemblies 410. A hinge assembly 410 includes a hinge body 411 formed by a plurality of chain segments, wherein the rotating rods 420 are fixedly connected with the hinge body 411 and are correspondingly rotated with the bend of the hinge body 411.

The cross-section of a rotating rod 420 includes a convex-arc-shape top surface 421 located near the flexible display body 100, a bottom surface 422 located opposite the top surface 421, two vertical surfaces 423 each connected with two sides of the top surface 421, and two inclined surfaces 424 each connected between the vertical surface 423 and the bottom surface 422.

Figure 2:
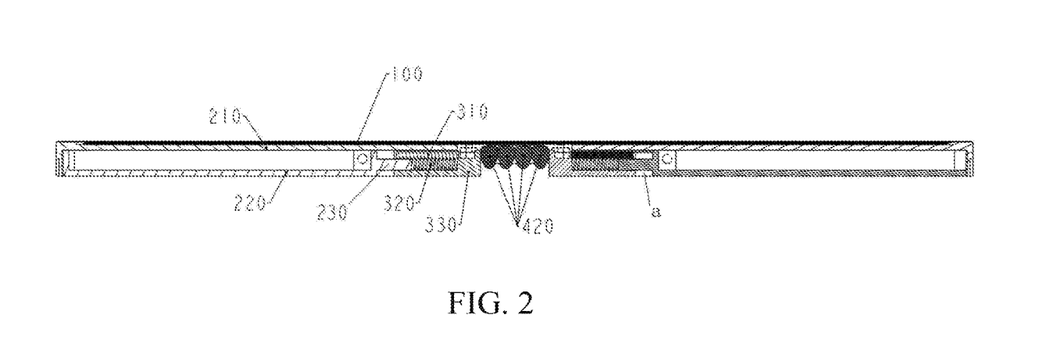
FIG. 2 is a schematic cross-sectional structural view of the bendable mobile terminal according to the embodiment of the present disclosure in a flat state.
Figure 3:
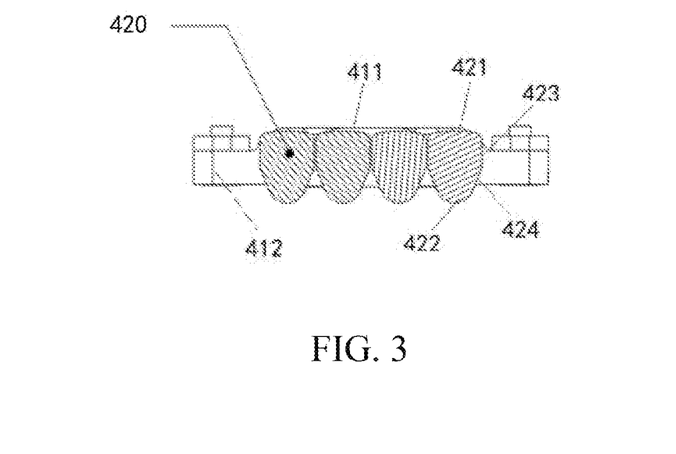
FIG. 3 is a schematic cross-sectional structural view of a hinge module of the bendable mobile terminal according to the embodiment of the present disclosure in the flat state.

Refer to FIG. 2 and FIG. 3, when the mobile terminal is in a flat state, the two case modules 200 are unfolded side by side, wherein the rotating rods 420 are arranged side by side, and the adjacent vertical surfaces 423 are arranged in parallel.

Figure 4:
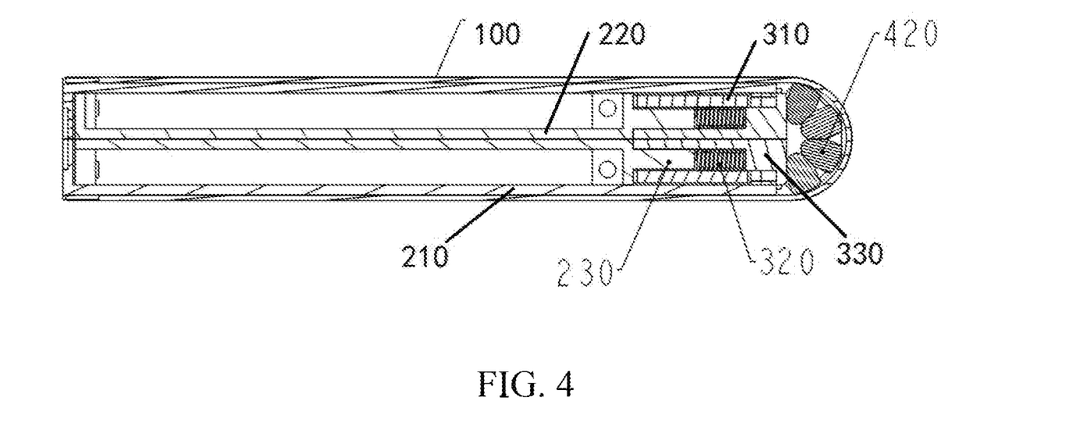
FIG. 4 is a schematic cross-sectional structural view of the bendable mobile terminal according to the embodiment of the present disclosure in a folded state.
Figure 5:
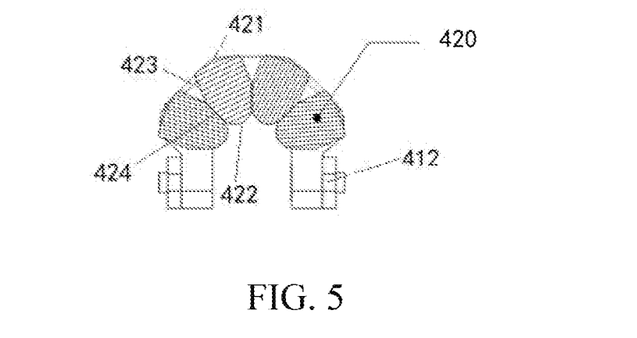
FIG. 5 is a schematic cross-sectional structural view of the hinge module of the bendable mobile terminal according to the embodiment of the present disclosure in the folded state.

Refer to FIG. 4 and FIG. 5, when the mobile terminal is in a folded state, the two case modules 200 are folded, wherein the rotating rods 420 are arranged in an arc shape, and the adjacent inclined surfaces 424 are attached to each other, so as to reduce a pulling force on the flexible display body 100.

Specifically, when the mobile terminal is in a flat state, the rotating rods 420 are arranged side by side, and the rotating rods 420 compose a flat-width. The inclined surfaces 424 between the adjacent rotating rods 420 have a gap of a predefined angle. When the rotating rods 420 are rotated with the rotation of the hinge assembly 410, the inclined surfaces 424 between the adjacent rotating rods 420 gradually close to each other, the gap is gradually decreased until the inclined surfaces 242 between the adjacent rotating rods 420 are attached to each other, to form an arc shape. At this moment, the arc length is almost equal to the flat-width of the rotating rods 420.

Furthermore, the hinge module 400 is connected with the two case modules 200, and the flexible display body 100 is attached on the two case modules 200, so that the hinge module 400 is located under a bending area of the flexible display body 100. That is, the flexible display body 100 can be bent with the rotation of the hinge module 400.

Therefore, in the bendable mobile terminal of the present disclosure, because the shape of the rotating rods 420 in the hinge module 400, when going to the folded state, the rotating rods 420 will be rotated with the rotation of the hinge assembly 410, and finally become an arc shape, so that the length of the folded flexible display body 100 and the total length of an upper surface of the two case modules 200 are almost the same, thus a sliding distance and a pulling force on the flexible display body 100 can be reduced, so as to prevent being broken.

In the embodiment, when the mobile terminal is in the folded state, the rotating rods 420 are rotated to form a semicircle, wherein the number of the rotating rods 420 is from cutting the semicircle. When there are more of the cutting numbers, the flat-width of the rotating rods 420 will be more equal to the folded arc length of the semicircle, and the inclined surfaces 424 remain inclined surfaces after the above-mentioned cutting action according to the cutting lines.

Furthermore, the number of the rotating rods 420 is an even number. When the rotating rods 420 is even numbers, on the one hand, the rotating rods 420 in the semicircle can be in a symmetrical state, and with the rotating rods 420 being changed from the flat state to the folded state, each rotation angles of the rotating rods 420 is the same, so as to improve the stability of the module 400 and the flexible display body 100 when in folded state; and on the other hand, by the arrangement of the even number of rotating rods 420, the fixed connection between the rotating rod 420 and the hinge assembly 410 can be more convenient, so as to improve the assembly efficiency.

Figure 6:
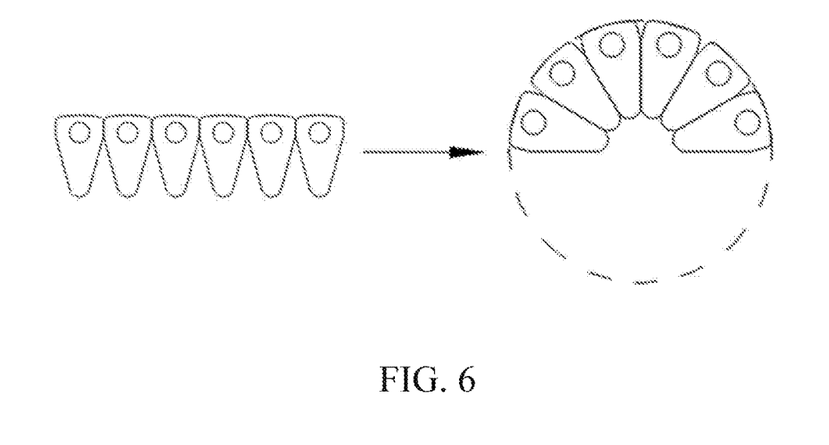
FIG. 6 is a schematic cross-sectional structural view of a bendable mobile terminal according to another embodiment of the present disclosure showing rotating rods from a flat state to a folded state.

Please refer to FIGS. 3 and 5, in the embodiment, the number of the rotating rods 420 is four. Please refer to FIG. 6, in another embodiment, the number of the rotating rods is six.

In the embodiment, the top surface 421 is a convex-arc-shape surface. When the mobile terminal is in the folded state, the convex-arc-shape surface forms an arc surface of a semicircle. When the top surface 421 is a convex-arc-shape surface, it is convenient for the top surfaces of the rotating rods 420 to support the flexible display body 100, so that the flexible display body 100 can be smoothly bent in a bending area, so as to protect and support the flexible display body 100.

In the embodiment, please refer to FIG. 7, the hinge body 411 includes a plurality of connecting shafts 413 for connecting between the two adjacent chain segments or connecting between the chain segment and a connecting part. The rotating rods 420 are fixedly connected with the connecting shaft 413 one to one. Specifically, a fixing portion is disposed at an end of the connecting shaft 413 facing to the rotating rod 420, and connecting holes are disposed at two ends of the rotating rod 420, so that the fixing portion is fixedly disposed into the connecting hole, wherein the fixing portion can be connected into the connecting hole by a screwing connection, an engaging match, or a plug-n match.

In the embodiment, the top surface 421 and the vertical surface 423 are connected by a round corner, and the vertical surface 423 and the inclined surface 424 are also connected by a round corner. By disposing the round corners, the outer profile surfaces of the rotating rod 420 are smoothly transited, and when rotating the adjacent rotating rods 420, the wear between each of the adjacent rotating rods 420 is avoided, so as to improve service life.

Based on the above-mentioned structure, in an actual operation, the flat-width of the rotating rods 420 is slightly smaller than the arc length of the semicircle in the folded state, so that when the mobile terminal is rotated, the case modules 200 further need to slide toward the hinge module 400 for a small distance, so as to reduce influence of a pulling force when the flexible display body 100 is bent, even when not influenced by the pulling force.

Based on the above-mentioned situation, please refer to FIG. 2 and FIG. 4, in the embodiment, two sides of the hinge module 400 are respectively connected with the two case modules 200 by a spring module 300, wherein one side of the spring module 300 is fixedly connected with the hinge module 400, and another side of the spring module 300 is slidably connected to the case module 200.

In the embodiment, when the mobile terminal is bent and the hinge module 400 is simultaneously rotated. Because the flat-width of the rotating rods 420 is slightly smaller than the arc length of the semicircle, the flexible display body 100 fixedly disposed on the case module 200 bears a slight pulling force. Therefore, in order to overcome the pulling force, the two case modules 200 is slide toward the spring module 300, so as to avoid a damage of the flexible display body 100.

Figure 8:
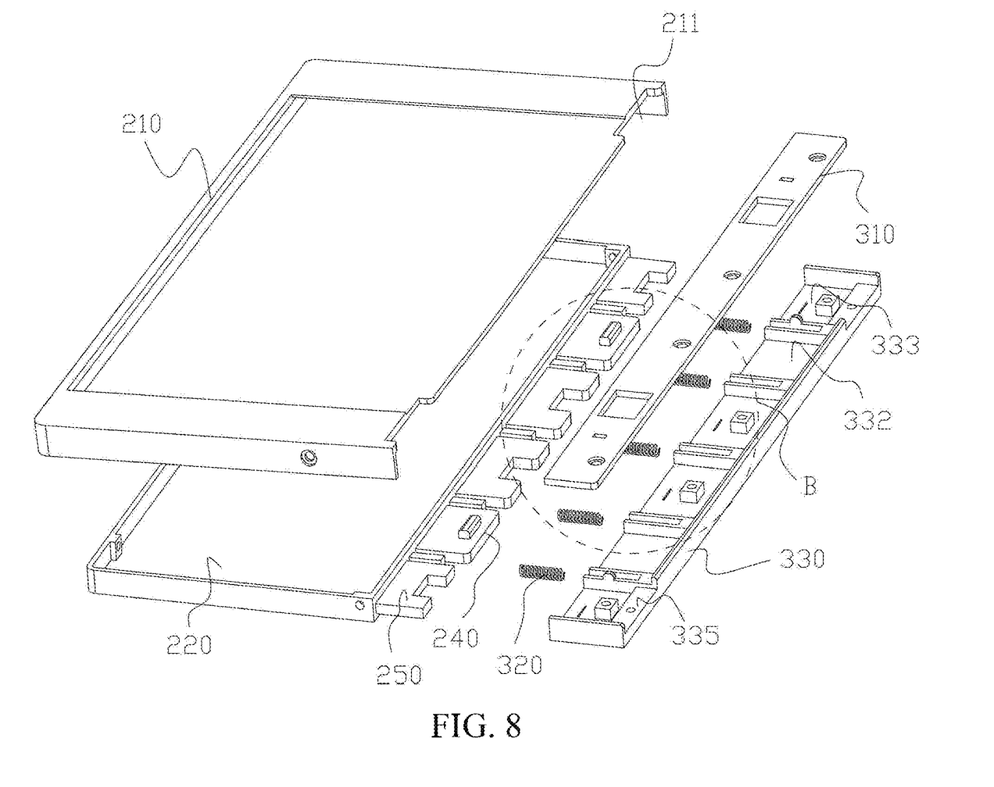
FIG. 8 is a schematic exploded structural view of a spring module and a case module of the bendable mobile terminal according to the embodiment of the present disclosure.
Figure 9:
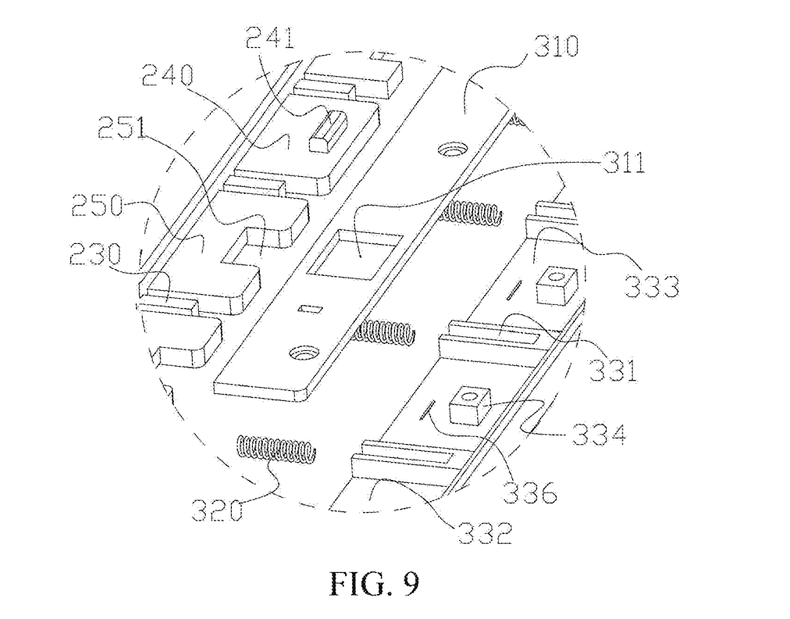
FIG. 9 is an enlarged view of a "B" part in FIG. 8.

Specifically, please refer to FIG. 8 and FIG. 9, the spring module 300 includes a bottom case 330, a plurality of placement grooves 331 formed on the bottom case 330, and a plurality of springs 320 disposed in the placement grooves 331.

The case module 200 includes an upper case 210 for an arrangement of the flexible display body 100, a lower case 220 for an assembly with the upper case 210, and a plurality of pressing portions 230 disposed on the lower case 220 and inserted into the placement groove 331 for pressing the spring 320.

When the mobile terminal is in a flat state, the case module 200 is away from the spring module 300, so that there is a sliding gap "a" between the case module 200 and the spring module 300, and the spring 320 has a first elastic potential energy.

When the mobile terminal is in a folded state, the case module 200 is close to the spring module 300, so that the sliding gap "a" between the case module 200 and the spring module 300 is reduced, and the pressing portion 230 presses the spring 320, thus the spring 320 has a second elastic potential energy.

The second elastic potential energy is greater than the first elastic potential energy.

Because the second elastic potential energy is greater than the first elastic potential energy, when the mobile terminal is changed from the flat state to the folded state, the spring 320 will provide an outward recovery force, so as to ensure that the case module 200 can slide back to the original position.

In the present embodiment, the spring module 300 includes sliding grooves alternately arranged with the placement grooves 331. The case module 200 includes sliding portions alternately arranged with the pressing portions 230, and the sliding portions are slidably disposed in the sliding grooves.

The placement grooves 331 and the sliding grooves are alternately arranged, so that the space arrangement of the placement groove 331 and the sliding groove is more reasonable and balanced. Furthermore, because the sliding portion is slidably disposed in the sliding groove, the sliding connection between the sliding portion and the bottom case 330 is more balanced. In the same way, the balance of the force on the lower case 220 is improved.

In the embodiment, the sliding groove includes a first sliding groove 332, and the first sliding groove 332 is symmetrically disposed at two end regions of the lower case 220; and the sliding portion includes a first sliding portion 240, and the first sliding portion 240 is correspondingly disposed in the first sliding groove 332.

The spring module 300 includes a cover plate 310 disposed on the bottom case 330 and a limiting opening 311 disposed on the cover plate 310. The first sliding portion 240 has a limiting block 241 disposed facing the cover plate 310, and the limiting block 241 is slide and limited in the limiting opening 311.

The limiting block 241 and the limiting opening 311 can avoid an excessive sliding of the case module 200.

In the embodiment, the sliding groove includes a second sliding groove 333, and the second sliding groove 333 has a fixing block 334. The sliding portion includes a second sliding portion 250, and the second sliding portion 250 has avoidance groove 251 facing the fixing block 334. The cover plate 310 is fixedly connected with the fixing block 334 by a screw.

The second sliding portion 250 is correspondingly slidably disposed in the second sliding groove 333. When the mobile terminal is in the folded state, the fixing block 334 is located in the avoiding groove 251.

The fixing block 334, on the one hand, is used to support the cover plate 310 so as to improve the stability of the cover 310; on the other hand, it is used to fixedly connect with the cover plate 310 so as to improve the stability of the spring module 300.

The avoidance groove 251, on the one hand, is used to prevent the second sliding portion 250 from touching the fixing block 334 when sliding in the second sliding groove 333, thereby to affect the sliding of the second sliding groove 333, wherein the size of the avoiding groove 261 is greater than the size of the fixing block 334; on the other hand, the arrangement space of the second sliding portion 250 in the second sliding groove 333 is saved.

Specifically, the fixing block 334 has a threaded hole, and the corresponding position of the cover plate 310 has a through hole, and a screw is screwed into the threaded hole through the through hole.

Furthermore, when the mobile terminal is in the folded state, the spring 320, in a pressed state, has an elastic recovery force, which will push the pressing portion 230 to an opposite direction, so as to lead the sliding portion to reversely slide, so that the influence of the sliding portion due to the recovery force of the spring 320 is reduced.

Therefore, a limiting strip 336 is disposed in the second sliding groove 333 and at an end of the fixing block 334 away from the hinge module 400, and a limiting groove is disposed on a bottom surface of the second sliding portion 250. When the mobile terminal is in the folded state, the limit strip 336 is limited in the limit groove (not shown in the figure) to reduce or overcome the recovery force of the spring 320, so as to ensure the stability of the mobile terminal in the folded state.

Furthermore, the limiting strip 336 is located in a sliding direction of the avoidance groove 251 of the second sliding portion 250. By such an arrangement, when the mobile terminal is in the flat state, only to enlarge the length of the avoiding groove 251, the limiting strip 336 can be located in the avoidance groove 251, thereby to reduce the manufacturing process and to improve the efficiency.

In the present embodiment, the hinge assembly 400 includes two connecting parts 412 for connecting the spring module 300 on the two sides of the hinge body 411. A receiving groove 335 is disposed on one side of the spring module 300 for receiving the connecting part 412. The connecting part 412 is fixedly disposed in the receiving groove 335.

In the embodiment, the connecting part 412 has a first through hole, and the bottom surface of the receiving groove 335 has a hole corresponding to the first through hole, so that the connecting part 412 can be fixedly connected with the receiving groove 335 by a screw, or the connecting part 412 is fixedly connected with the receiving groove 335 by a rivet, wherein the screw or the rivet passes through the first through hole and the hole.

In the embodiment, the upper case 210 has an avoidance opening facing the hinge module 400 to avoid the connecting part 412.

The operation steps of the embodiment are that:

When the mobile terminal is in a flat state, the flexible display body 100 is flatted and attached on the two upper cases 210 of the two case modules 200, and is located above the spring modules 300 and the hinge module 400.

Wherein, the four rotating rods 420 of the hinge module 400 are arranged side by side, and the vertical surfaces 423 of the four rotating rods 420 are all arranged in parallel or being attached together. The four rotating rods 420 have a flat-width, and there is a certain sliding gap "a" between the case modules 200 and the spring modules 300, and the pressing portion 230 is inserted into the positioning groove 331 and away from the hinge module 400, and the sliding portion is located at one end of the sliding groove away from the hinge module 400.

When the mobile terminal is in the folded state, the flexible display body 100 is bent, and the two case modules 200 are folded together;

Wherein, the four rotating rods 420 of the hinge module 400 are rotated with the rotation of the hinge assembly 410, and finally, the inclined surfaces 424 of the adjacent rotating rods 420 are attached to each other to form a semicircle shape, and the four rotating rods 420 have an arc length of the semicircle. The case module 200 slides toward the hinge module 400 under a pulling of the flexible display body 100, so that the sliding gap between the case modules 200 and the spring modules 300 is reduced. At the same time, the pressing portion 230 moves in the placement groove 331 and pushes the spring 320 to make the spring 320 in a pressed state, and the fixing block 241 is limited in the avoidance groove 334.

When the mobile terminal is changed from the folded state to the flat state, the springs 320 will provide an outward recovery force to push the case modules 200 back to the original position.

The operation steps of the embodiment is finished.

Compared with conventional mobile terminal, the bendable mobile terminal of the present disclosure has a plurality of rotating rods in a hinge module, and the plurality of rotating rods are rotated with hinge assemblies when in a folded state, and finally, it becomes an arc shape, so that the length of the flexible display body in the folded state is almost the same as the total length of the upper surfaces of the two case modules, thereby a sliding distance and a pulling force on the flexible display body can be reduced, so as to prevent being broken. This solves the technical problem that a bendable area of the display screen is easily broken when the conventional bendable mobile terminal is bent.

Moreover, despite one or more implementations relative to the present disclosure being illustrated and described, equivalent alterations and modifications will occur to others skilled in the art upon reading and understanding this specification and the annexed drawings. The present disclosure comprises such modifications and variations, and is to be limited only by the terms of the appended claims. In addition, although a particular feature of the disclosure may have been disclosed with respect to only one of several implementations, such a feature may be combined with one or more other features of the other implementations as may be desired and advantageous for any given or particular application. Also, to the extent that the terms "including," "includes", "having", "has", "with" or variants thereof are used in the detailed description or in the claims, such terms are intended to be inclusive in a manner similar to the term "comprising".

As mentioned above, the present invention has been disclosed in the above embodiments, and the serial numbers before the embodiments, such as "first", "second", etc., are used for convenience of description only, and the order of the embodiments of the present invention is not limited. Furthermore, the present disclosure has been described with preferred embodiments thereof and it is understood that many changes and modifications to the described embodiment can be carried out without departing from the scope and the spirit of the invention that is intended to be limited only by the appended claims.

What is claimed is:

1. A bendable mobile terminal, comprising:
two case modules configured to carry a flexible display body;
a hinge module disposed between the two case modules, such that the two case modules are being able to be bent; and
the flexible display body fixedly disposed on the two case modules;
wherein the hinge module comprises two hinge assemblies connecting the two case modules together and a plurality of rotating rods disposed between the two hinge assemblies; one of the hinge assembly comprises a hinge body formed by a plurality of chain segments; and the rotating rods are fixedly connected with the hinge body and are correspondingly rotated with a bend of the hinge body;
a cross-section of one of the rotating rod comprises a convex-arc-shape top surface located near the flexible display body, a bottom surface located opposite the top surface, two vertical surfaces each connected with two sides of the top surface, and two inclined surfaces each connected between the vertical surface and the bottom surface;
when the mobile terminal is in a flat state, the two case modules are unfolded side by side, wherein the rotating rods are arranged side by side, and the adjacent vertical surfaces are arranged in parallel; and
when the mobile terminal is in a folded state, the two case modules are folded; wherein the rotating rods are arranged in an arc shape and the adjacent inclined surfaces are attached to each other, so as to reduce a pulling force on the flexible display body;
wherein a number of the rotating rods is an even number;
wherein two sides of the hinge module are respectively connected with the two case modules by a spring module, wherein one side of the spring module is fixedly connected with the hinge module, and another side of the spring module is slidably connected to the case module;
the spring module comprises a bottom case, a plurality of placement grooves formed on the bottom case, and a plurality of springs disposed in the placement grooves;
the case module comprises an upper case for an arrangement of the flexible display body, a lower case for an assembly with the upper case, and a plurality of pressing portions disposed on the lower case and inserted into the placement groove for pressing the spring;
when the mobile terminal is in the flat state, the case module is away from the spring module, so that there is a sliding gap between the case module and the spring module, and the spring has a first elastic potential energy;
when the mobile terminal is in the folded state, the case module is close to the spring module, so that the sliding gap between the case module and the spring module is reduced, and the pressing portion presses the spring, thus the spring has a second elastic potential energy; and
the second elastic potential energy is greater than the first elastic potential energy.

2. The bendable mobile terminal according to claim 1, wherein the spring module comprises sliding grooves alternately arranged with the placement grooves; the case module comprises sliding portions alternately arranged with the pressing portions; and the sliding portions are slidably disposed in the sliding grooves.

3. The bendable mobile terminal according to claim 2, wherein the sliding groove comprises a first sliding groove, and the first sliding groove is symmetrically disposed at two end regions of the lower case; and the sliding portion comprises a first sliding portion, and the first sliding portion is correspondingly disposed in the first sliding groove; and
the spring module comprises a cover plate disposed on the bottom case and a limiting opening disposed on the cover plate; the first sliding portion has a limiting block disposed facing the cover plate; and the limiting block is slide and limited in the limiting opening.

4. The bendable mobile terminal according to claim 3, wherein the sliding groove comprises a second sliding groove, and the second sliding groove has a fixing block; the sliding portion comprises a second sliding portion, and the second sliding portion has avoidance grooves facing the fixing block; the cover plate is fixedly connected with the fixing block by a screw; and
the second sliding portion is correspondingly slidably disposed in the second sliding groove; and when the mobile terminal is in the folded state, the fixing block is located in the avoiding groove.

5. The bendable mobile terminal according to claim 4, wherein the bottom case comprises a limiting strip, which is disposed in the second sliding groove and at an end of the fixing block away from the hinge module; the limiting strip is located in a sliding direction of the avoidance groove; the second sliding portion comprises a limiting groove disposed on a surface of the second sliding portion back facing the cover plate;
when the mobile terminal is in the flat state, the limit strip is limited in the avoiding groove; and
when the mobile terminal is in the folded state, the limit strip is limited in the limit groove.

6. The bendable mobile terminal according to claim 1, wherein the hinge assembly comprises two connecting parts for connecting the spring module on the two sides of the hinge body; a receiving groove is disposed on one side of the spring module for receiving the connecting part; and the connecting part is fixedly disposed in the receiving groove.

7. The bendable mobile terminal according to claim 1, wherein the hinge body comprises a plurality of connecting shafts for connecting between the two adjacent chain segments or connecting between the chain segment and a connecting part; and the rotating rods are fixedly connected with the connecting shaft one to one.

8. The bendable mobile terminal according to claim 1, wherein the top surface and the vertical surface are connected by a round corner; and the vertical surface and the inclined surface are connected by a round corner.

9. A bendable mobile terminal, comprising:
two case modules configured to carry a flexible display body;
a hinge module disposed between the two case modules, such that the two case modules are being able to be bent; and
the flexible display body fixedly disposed on the two case modules;
wherein the hinge module comprises two hinge assemblies connecting the two case modules together and a plurality of rotating rods disposed between the two hinge assemblies; one of the hinge assembly comprises a hinge body formed by a plurality of chain segments; and the rotating rods are fixedly connected with the hinge body and are correspondingly rotated with a bend of the hinge body;

a cross-section of one of the rotating rod comprises a convex-arc-shape top surface located near the flexible display body, a bottom surface located opposite the top surface, two vertical surfaces each connected with two sides of the top surface, and two inclined surfaces each connected between the vertical surface and the bottom surface;

when the mobile terminal is in a flat state, the two case modules are unfolded side by side, wherein the rotating rods are arranged side by side, and the adjacent vertical surfaces are arranged in parallel; and when the mobile terminal is in a folded state, the two case modules are folded; wherein the rotating rods are arranged in an arc shape and the adjacent inclined surfaces are attached to each other, so as to reduce a pulling force on the flexible display body.

10. The bendable mobile terminal according to claim 9, wherein a number of the rotating rods is an even number.

11. The bendable mobile terminal according to claim 9, wherein two sides of the hinge module are respectively connected with the two case modules by a spring module, wherein one side of the spring module is fixedly connected with the hinge module, and another side of the spring module is slidably connected to the case module;

the spring module comprises a bottom case, a plurality of placement grooves formed on the bottom case, and a plurality of springs disposed in the placement grooves;

the case module comprises an upper case for an arrangement of the flexible display body, a lower case for an assembly with the upper case, and a plurality of pressing portions disposed on the lower case and inserted into the placement groove for pressing the spring;

when the mobile terminal is in the flat state, the case module is away from the spring module, so that there is a sliding gap between the case module and the spring module, and the spring has a first elastic potential energy;

when the mobile terminal is in the folded state, the case module is close to the spring module, so that the sliding gap between the case module and the spring module is reduced, and the pressing portion presses the spring, thus the spring has a second elastic potential energy; and the second elastic potential energy is greater than the first elastic potential energy.

12. The bendable mobile terminal according to claim 11, wherein the spring module comprises sliding grooves alternately arranged with the placement grooves; the case module comprises sliding portions alternately arranged with the pressing portions; and the sliding portions are slidably disposed in the sliding grooves.

13. The bendable mobile terminal according to claim 12, wherein the sliding groove comprises a first sliding groove, and the first sliding groove is symmetrically disposed at two end regions of the lower case; and the sliding portion comprises a first sliding portion, and the first sliding portion is correspondingly disposed in the first sliding groove; and the spring module comprises a cover plate disposed on the bottom case and a limiting opening disposed on the cover plate; the first sliding portion has a limiting block disposed facing the cover plate; and the limiting block is slide and limited in the limiting opening.

14. The bendable mobile terminal according to claim 13, wherein the sliding groove comprises a second sliding groove, and the second sliding groove has a fixing block; the sliding portion comprises a second sliding portion, and the second sliding portion has avoidance grooves facing the fixing block; the cover plate is fixedly connected with the fixing block by a screw; and the second sliding portion is correspondingly slidably disposed in the second sliding groove; and when the mobile terminal is in the folded state, the fixing block is located in the avoiding groove.

15. The bendable mobile terminal according to claim 14, wherein the bottom case comprises a limiting strip, which is disposed in the second sliding groove and at an end of the fixing block away from the hinge module; the limiting strip is located in a sliding direction of the avoidance groove; the second sliding portion comprises a limiting groove disposed on a surface of the second sliding portion back facing the cover plate;

when the mobile terminal is in the flat state, the limit strip is limited in the avoiding groove; and when the mobile terminal is in the folded state, the limit strip is limited in the limit groove.

16. The bendable mobile terminal according to claim 11, wherein the hinge assembly comprises two connecting parts for connecting the spring module on the two sides of the hinge body; a receiving groove is disposed on one side of the spring module for receiving the connecting part; and the connecting part is fixedly disposed in the receiving groove.

17. The bendable mobile terminal according to claim 16, wherein the upper case has an avoidance opening facing the hinge module to avoid the connecting part.

18. The bendable mobile terminal according to claim 9, wherein the hinge body comprises a plurality of connecting shafts for connecting between the two adjacent chain segments or connecting between the chain segment and a connecting part; and the rotating rods are fixedly connected with the connecting shaft one to one.

19. The bendable mobile terminal according to claim 9, wherein the top surface and the vertical surface are connected by a round corner; and the vertical surface and the inclined surface are connected by a round corner.

* * * * *